(12) United States Patent
Mountain

(10) Patent No.: US 10,051,323 B2
(45) Date of Patent: Aug. 14, 2018

(54) NETWORK CONTENT MONITORING

(71) Applicant: DISH Technologies L.L.C., Englewood, CO (US)

(72) Inventor: Dale Llewelyn Mountain, Yorkshire (GB)

(*) Notice: Subject to any disclaimer, the term of this patent is extended or adjusted under 35 U.S.C. 154(b) by 117 days.

(21) Appl. No.: 13/673,079

(22) Filed: Nov. 9, 2012

(65) Prior Publication Data
US 2013/0117442 A1 May 9, 2013

(30) Foreign Application Priority Data

Nov. 9, 2011 (EP) ..................................... 11188381

(51) Int. Cl.
*G06F 15/173* (2006.01)
*H04N 21/45* (2011.01)
(Continued)

(52) U.S. Cl.
CPC ......... *H04N 21/45* (2013.01); *H04L 12/2812* (2013.01); *H04L 12/2834* (2013.01);
(Continued)

(58) Field of Classification Search
CPC ......... H04L 43/04; H04L 43/08; H04L 67/02; H04L 51/36; H04L 51/066; H04L 51/10;
(Continued)

(56) References Cited

U.S. PATENT DOCUMENTS 8,619,136 B2 * 12/2013 Howarter ............. G08B 13/196
340/328
2002/0184620 A1 12/2002 Davies et al.
(Continued)

FOREIGN PATENT DOCUMENTS

EP 1 631 004 A2 3/2006
WO 2011/095567 A1 8/2011

OTHER PUBLICATIONS

Extended European Search Report of corresponding European Application No. 11188381.5, dated Apr. 11, 2012, 7 pages.

*Primary Examiner* — Oscar Louie
*Assistant Examiner* — Da T Ton
(74) *Attorney, Agent, or Firm* — Kilpatrick Townsend & Stockton LLP

(57) ABSTRACT

A set-top-box is provided for receiving broadcast media content and processing said content for presentation on a display. A processor of the STB is configured to receive, from between a router circuit and a modem circuit, data packets sent over a local network. The data packets are sent to or from a local internet connected user device via the router as part of the local network. The processor is further configured to analyze the received data packets to determine whether they contain undesired content and, if so, to control the display to present an indicator containing at least one property of the detected undesired content. Because the STB is coupled to a display that tends to be the main display in a household, the indicator is more likely to be seen and acted on by a responsible party, thus parents will be more easily able to monitor the activity of their children when they use user devices to access the internet over a home network.

20 Claims, 8 Drawing Sheets

(51) Int. Cl.
*H04N 21/436* (2011.01)
*H04N 21/454* (2011.01)
*H04N 21/488* (2011.01)
*H04L 12/28* (2006.01)
*H04N 21/442* (2011.01)
*H04L 29/08* (2006.01)
*H04L 29/06* (2006.01)

(52) U.S. Cl.
CPC ........ *H04L 63/1416* (2013.01); *H04L 67/327* (2013.01); *H04N 21/43615* (2013.01); *H04N 21/44227* (2013.01); *H04N 21/44231* (2013.01); *H04N 21/454* (2013.01); *H04N 21/4882* (2013.01)

(58) Field of Classification Search
CPC ..... H04L 41/06; H04L 65/1006; H04L 12/12; H04L 12/58; G06Q 10/10; H04W 4/12; H04W 8/26; H04W 80/045; G06F 11/3409; G06F 11/2079; G06F 15/17343; G06F 19/3406; H04N 21/6582
USPC ........ 709/206, 223, 224, 231, 245; 725/131, 725/151, 85
See application file for complete search history.

(56) References Cited

U.S. PATENT DOCUMENTS

| | | | |
|---|---|---|---|
| 2004/0186989 A1* | 9/2004 | Clapper | G06F 21/6281 713/151 |
| 2005/0102407 A1* | 5/2005 | Clapper | G06F 17/30887 709/228 |
| 2007/0133505 A1* | 6/2007 | Kuchenhoff et al. | 370/352 |
| 2007/0183746 A1* | 8/2007 | Haeuser | H04N 5/76 386/214 |
| 2007/0192593 A1* | 8/2007 | Boisjolie | H04L 29/12367 713/162 |
| 2007/0240232 A1* | 10/2007 | Pino | H04N 7/17336 726/28 |
| 2008/0184284 A1 | 7/2008 | O'Hern | |
| 2008/0208868 A1* | 8/2008 | Hubbard | G06F 17/30867 |
| 2009/0073987 A1* | 3/2009 | Li | H04L 29/12462 370/395.31 |
| 2009/0133089 A1* | 5/2009 | Ku et al. | 725/131 |
| 2010/0071062 A1 | 3/2010 | Choyi et al. | |
| 2010/0107085 A1* | 4/2010 | Chadwick et al. | 715/738 |
| 2010/0125890 A1* | 5/2010 | Levine et al. | 725/131 |
| 2011/0060845 A1* | 3/2011 | Jungck | H04L 29/12028 709/245 |
| 2011/0277001 A1* | 11/2011 | Kaluskar | H04L 12/2818 725/80 |
| 2012/0017250 A1* | 1/2012 | Tirasirikul | H04N 7/18 725/85 |
| 2013/0076989 A1* | 3/2013 | Barnett | H04N 5/4403 348/734 |

* cited by examiner

NETWORK CONTENT MONITORING

TECHNICAL FIELD

The present invention relates to an apparatus and method for monitoring network content using a media device such as a set-top-box or television receiver.

BACKGROUND OF THE INVENTION

It is becoming increasingly common to have a number of user devices within a home that are each arranged to access the internet. For example, a typical home may include one or more desktop computers, one or more laptops, PDAs, smartphones and so on. Such devices will usually access the internet via a home network, particularly by connecting to a residential gateway.

Residential gateways are home networking devices used to connect devices to a Wide Area Network (WAN) such as the internet. The term "residential gateway" refers to the connection device between a home network and the WAN and may comprise one or more of a modem, such as a DSL (Digital Subscriber Line), ADSL (Asymmetric Digital Subscriber Line) or cable modem, a network switch, a router and a wireless access point if providing wireless access.

A typical arrangement is shown in FIG. 1. Here, a number of different devices including a home PC 101, a mobile phone 102 and a laptop 103 are connected to the internet 104 via a home gateway 105. The home gateway has a modem 106 and a router 107 that routes data packets between the various connected devices 101, 102, 103 and the modem, allowing the devices to share a common internet connection. When a data packet is sent by a connected device such as laptop 103 to a destination address over internet 104 the router removes the local IP source address from the packet and stores it in a table, Network Address Translation (NAT) table 108. The router also replaces the IP source address in the packet with the external IP address of the router/home gateway, inserts the destination IP address of the packet into the NAT table and associates it with the local IP address of the local device. When a response packet is received from the destination device over the internet the router determines the source IP address found in the header of the incoming packet and correlates this with the destination IP address stored in the NAT table. As a result, the router determines the associated local IP address and forwards the packet to the appropriate local IP address such that it reaches the appropriate local user device such as laptop 103. In this way multiple local user devices with local IP addresses can share a common external IP address and communicate over the internet.

With such a large number of different devices accessing the internet within a home via a common connection it is becoming increasingly difficult for parents to monitor and police the content that their children are consuming from the internet. Previous attempts to control or monitor accessed content have relied upon hardware or software firewalls to restrict content, or monitoring programs to track the websites visited by a user or a user device. Programs or hardware that restricts internet access often rely on a pre-approved list of website addresses that are safe to visit and may be overly restrictive. Monitoring programs only allow the parent to check visited websites after the event. These types of restriction and monitoring methods do not present the monitoring party (i.e. the parent or authority) with real time monitoring of accessed content at a location that is likely to be viewed until after the access, or attempted access, has occurred.

There is a need for a way of monitoring content being consumed by network users within a home network preferably that can be easily accessed by a responsible party and that will not drain computing resources unnecessarily.

SUMMARY OF THE INVENTION

The invention is defined in the independent claims to which reference is now directed. Preferred features are set out in the dependent claims.

Set-top-boxes are generally understood to contain a dedicated processor for processing received broadcast data containing video and audio information and converting this information into video and audio streams for provision to a display that may be directly coupled or connected to the set-top-box output.

Embodiments of the invention may provide a set-top-box for receiving broadcast media content and processing said content for presentation on a display. Typically, such set-top-boxes include a receiver and demodulator as well as audio/video processors to process the received content into a format compatible with a display connected to the STB via an output. In addition, a processor of the STB is configured to receive, from between a router circuit and a modem circuit, data packets sent over a local network. The data packets are being sent to or from a local internet connected user device, such as a laptop, via the router as part of the local network. The processor is further configured to analyse the received data packets to determine whether they contain undesired content and, if so, to control the display to present an indicator containing at least one property of the detected undesired content. Because the STB is coupled to a display that tends to be the main display in a household, the indicator is more likely to be seen and acted on by a responsible party, thus parents will be more easily able to monitor the activity of their children when they use user devices to access the internet over a home network.

The analysis of the data packets is preferably achieved by performing deep packet inspection (DPI). The undesired content may be a predetermined text string corresponding to a word or set of words, or a file type, the set top box further comprising a memory for storing data indicative of the undesired words or file types. The processor is then further configured to compare data contained within the data packets, extracted by performing DPI, with the data stored in the memory to determine whether the data packets contain undesired content, wherein the data extracted from the data packets preferably includes one or more of a website name or URL, a word or set of words contained in a website, a file name extension or a file name.

Preferably the processor is operable to receive data from a table containing the destination and source of data packets, the processor being further configured to determine the target local user device to/from which the data packet are being sent/received and to present, in the indicator, data indicative of the target local user device, the data table preferably being a NAT table maintained by the router circuit.

The set-top-box may be further configured to receive input from a user identifying one or more user devices to be monitored; store data in a memory indicative of the one or more identified user devices; and to present an indicator containing at least one property of the detected undesired content only when the data stored in memory identifies the device to/from which the data packet is sent as a user device to be monitored. In this way, the STB can monitor what user devices are accessing undesired content, and only bother the viewers of the display with an indicator when a desired user is accessing undesired content.

One or both of the router circuit and the modem circuit may be integral to the set-top-box, and the set-top-box may preferably be configured to act as a residential gateway. When at least the router circuit is integral to the set-top-box the set-top-box preferably further comprises a connection between the router NAT table and the processor. This allows the set-top-box to utilise the data table within the router to determine which packets are destined for which user devices over the local network.

Preferably the set-top-box is configured to receive power status information data from the display indicative of whether the display is activated or in standby mode, the set-top-box being configured to determine, based on the received data from the display, whether the display is activated or in standby mode. When the display is determined to be activated the set-top-box may be configured to send the indicators containing at least one property of the undesired content to the display for presentation to a user. When the display is determined to be in standby mode the set-top-box may be configured to undertake a second action. The second action may comprise sending the indicator to a further user device, such as a mobile phone or computer, via a network connection, preferably in the form of a Multimedia Messaging Service message or an email. The further user device preferably belongs to, or is accessible by, a responsible party or administrator. Alternatively, or in addition, the second action may comprise storing, in a memory or store, data representing the at least one property of the detected undesired content and controlling the display to present the indicator, containing the at least one property, when the display is next determined to be activated. The set-top-box may be configured to send a request message to the display requesting power status information when undesired content is found or when an indicator containing at least one property of the undesired content is to be displayed. Preferably the set-top-box is coupled to the display by HDMI, or an HDMI cable, and the power status information request and data is sent by CEC. The set-top-box may comprise a dedicated detector circuit to determine whether the display is activated or deactivated, or the processor may be configured to carry out this task.

The processor used to perform the functionality described above may be a separate processor to that used to process the broadcast media content for display, and is preferably a DSP.

The processor may be further configured to filter data packets containing undesired content such that they do not reach the destination user device.

As mentioned above, the display to which the set-top-box is coupled is preferably the main display for the set-top-box. That is, the display is a local display that is preferably directly coupled to the set-top-box by a direct link from a physical port on the STB rather than over the local network. This is preferably by a cable such as an HDMI cable, or an internal cable or wire when the set-top-box and display are integral, but could also be by a suitable wireless link such as Bluetooth.

A corresponding method may be provided of indicating when a user device on a local network is accessing undesired content, the method comprising: providing a set-top-box for receiving and processing broadcast media content for presentation on a display; receiving, at a processor of the set-top-box, data packets, from between a router circuit and a modem circuit, sent over a local network to or from a local user device via the router circuit; analysing said data packets using the processor to determine whether they contain undesired context; and if undesired content is found, controlling the display to present an indicator containing at least one property of the detected undesired content. The method may further include any of the steps for which the set-top-box above is configured to undertake.

A computer program may also be provided which when operated on a set-top-box, such as the one described above or below, causes it to carry out the methods described above or below.

BRIEF DESCRIPTION OF THE FIGURES

Embodiments of the invention will now be described in relation to the figures, in which.

DETAILED DESCRIPTION OF PREFERRED EMBODIMENTS

Figure 1:
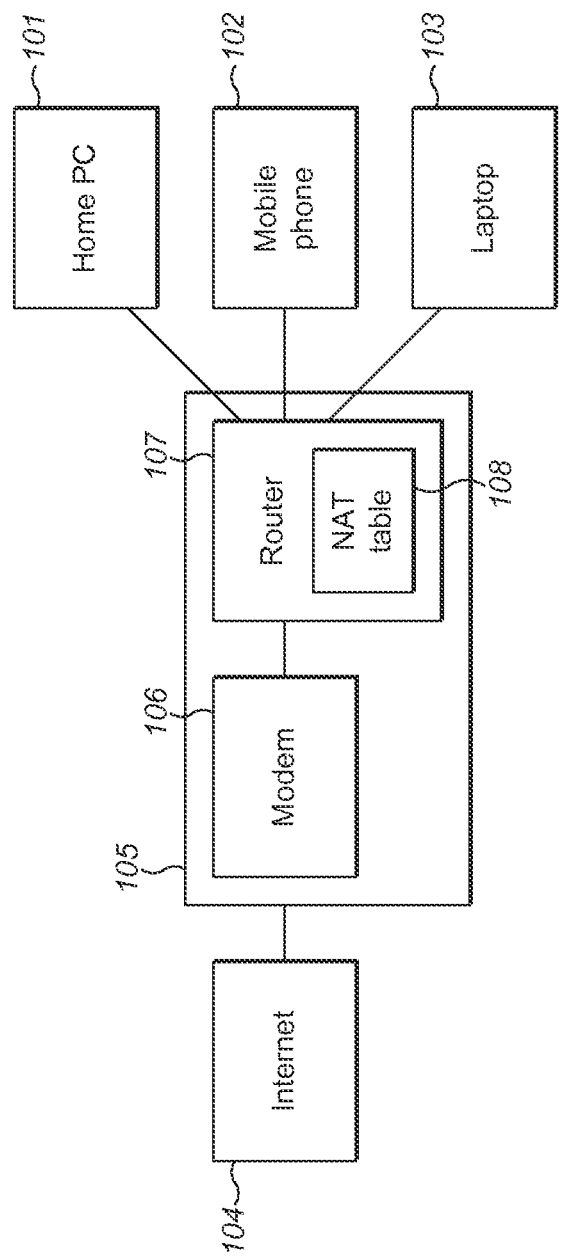
FIG. 1: shows a typical local network arrangement.
Figure 2:
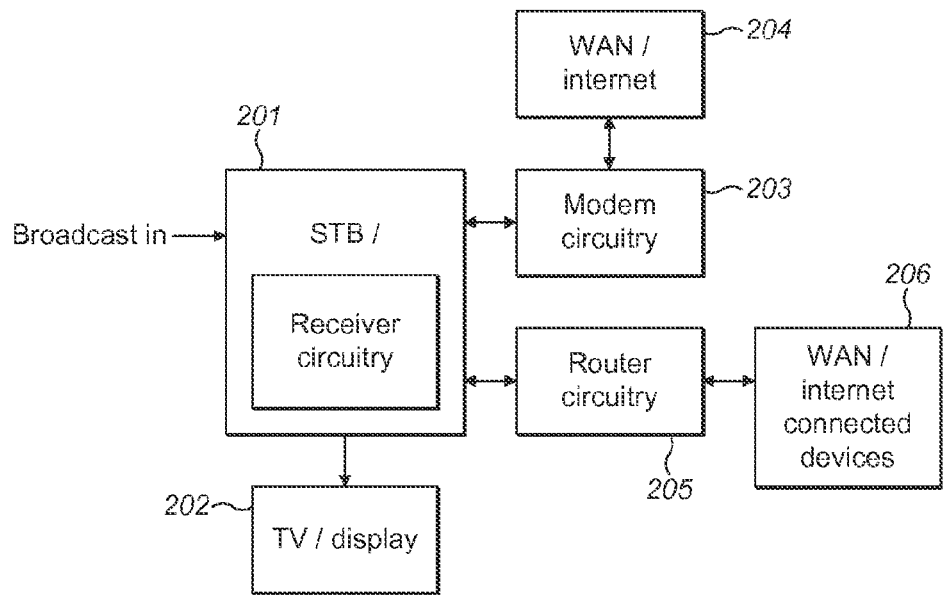
FIG. 2: shows a schematic of the elements of an embodiment of the invention.

FIG. 2 shows a schematic of the elements involved in an embodiment of the invention. The figure shows the functions, and logical connections, of these elements and not their physical locations since one or more of the elements may be combined into a single unit as described herein.

Figure 3:
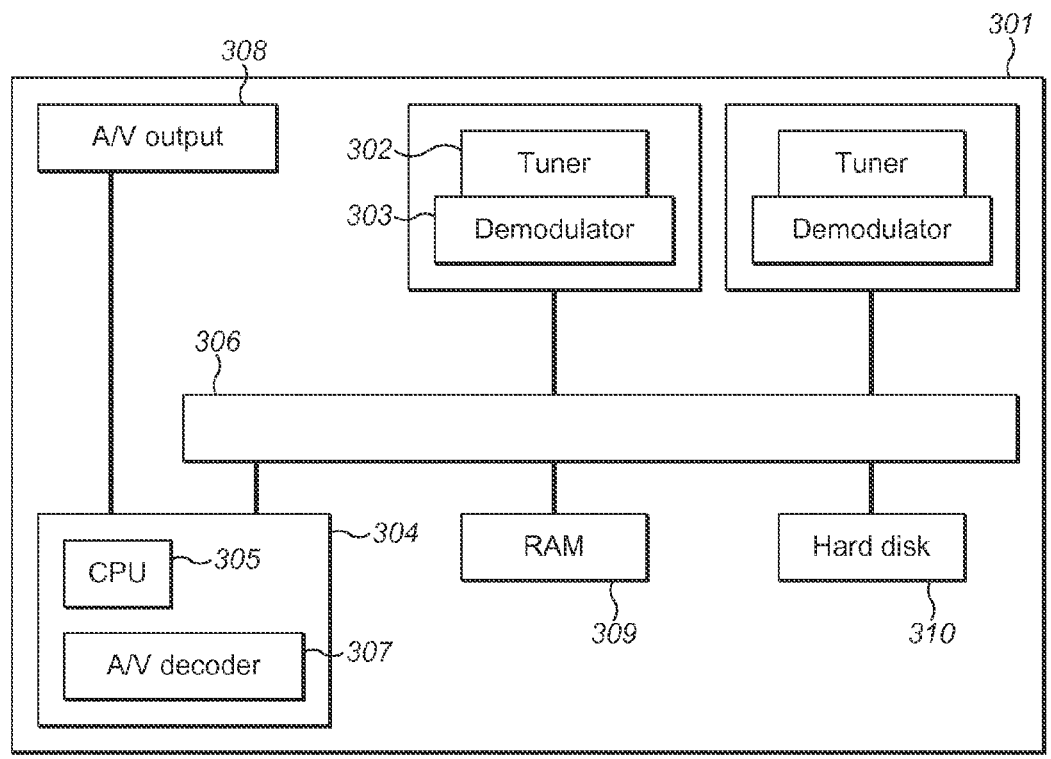
FIG. 3: shows a known STB.

The STB/receiver circuitry 201 functions as a STB of the sort shown in FIG. 3. The set-top-box 301 comprises a receiver (not shown) for receiving broadcast signals including encoded media content, such as video and audio content. The media content is provided to a processor for decoding and outputting the content. In the example of FIG. 3, a tuner 302 is included that tunes to and amplifies a particular analogue broadcast frequency, although a digital arrangement could be used for receiving digital broadcasts. A demodulator 303 converts the signal from the tuner into a digital signal that may be processed by the processor. The set-top-box may optionally be equipped to receive and process multiple broadcasts, for example by having more than one tuner/demodulator package, as shown in FIG. 3, that can each display/record a television channel simultaneously with another channel.

The tuner/demodulator of the STB of FIG. 3 is connected to a processor chip 304, comprising a CPU 305, by a bus 306. The main processor 304 of the set-top-box runs the set-top-box software and controls and coordinates the other set-top-box components. The A/V decoder 307 is a digital processor responsible for decoding the audio and video data and is typically provided on the same physical chip as the CPU. The A/V decoder, which may also be provided as separate audio and video units, receives and decodes the signal provided by the demodulator. The decoded audio/video signals are provided to the A/V output 308, which provides an audio and video signal that can be connected to an output device or display device such as a television 202. The RAM 309 can also be used by both the processor and the decoders. The hard disk 310 is optionally provided for storing recorded content for presentation at a later time. The hard disk can also be used to store metadata used, for example, for Electronic Program Guides (EPGs) or other types of interactive content. Alternatively a flash memory, or any other type of memory, could alternatively, or in addition, be provided for this purpose. STBs of the sort shown in FIG. 3 can be used to receive and decode broadcasts sent using many different methods including over the air, via satellite or cable.

Although in FIG. 2 the STB/receiver circuitry is shown separately to the television/display, it is possible for the two to be combined into a single unit by incorporating the example device of FIG. 3 into the display.

Referring again to FIG. 2, the modem circuitry 203 is configured to perform the function of adapting signals from one transmission system to another, such as by modulating and demodulating a carrier signal to decode transmitted information, as is known in the art. Modems come in a variety of types, including analogue modems that communicate over telephone lines, digital modems such as ADSL modems and cable modems. Modems are typically used to modulate and demodulate data for sending and receiving over a network such as a WAN and in particular the internet 204.

The router circuitry 205 performs the function of routing data packets to/from the modem from/to one or more internet connected devices 206 in the manner described above and known in the art. Router circuitry 205 allows a plurality of internet connectable user devices such as laptops, PDAs, home computers, mobile phones, games consoles, portable media players, internet enabled TVs and STBs etc, to share a single internet connection through modem circuitry 203. User devices in this context are therefore intended to be devices connectable to the internet or other WAN on which a user can consume content received therefrom.

During operation data packets are received by modem circuitry 203 from the internet 204 in modulated form and demodulated for further processing. The modem circuitry passes the demodulated data packets on to STB circuitry 201 which, simultaneously with performing the function of receiving broadcasts, decoding and outputting them to a display, performs a monitoring function on the data packets. The data packets are then passed to router circuitry 205 for subsequent distribution to internet connected user devices connected to the home network.

The monitoring process performed on the data packets may involve a variety of different techniques to determine the content being downloaded to local user devices. This can be achieved by looking at the content itself or by checking the origin of the data based on packet properties or data contained in the packets. Particular examples of monitoring or inspection methods will be described below.

In certain embodiments, when the STB circuitry detects data or data packets passing though a monitoring point it may display a property of the data on the display to which it is connected. Preferably this is achieved by outputting a warning or indicator, including the data property, overlaid on top of any content being displayed by the STB circuitry. This can be achieved by utilising the picture in picture (PIP) or closed caption/subtitle functionality of a STB to display the indicator. The data property displayed may include the website address from which the received data originated and the data property may, preferably, be displayed for a predetermined period of time each time the system determines that a new website is accessed. In addition, the data displayed on the screen may indicate if a particular file type is being streamed or downloaded, with the type of file being displayed, such as "MP3" or "JPEG", or the type of data such as "video file" or "audio file".

Figure 4:
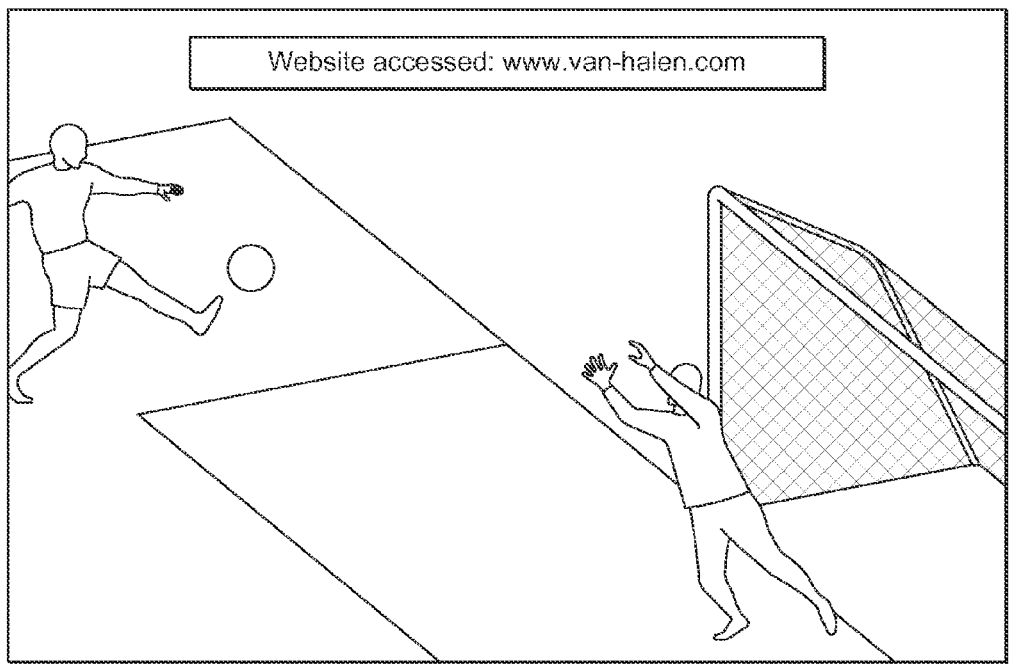
FIG. 4: shows an example of an indicator or warning presented on a display.

FIG. 4 shows an example of an indicator overlaid over media content being displayed on a television screen. The indicator or warning is preferably small in comparison to the display, occupying 10% or less of the screen size. Preferably the indicator contains only a single data property field, such as the website address, so as to avoid presenting excessive information. The indicator text may be limited to a predetermined number of characters such as fewer than 180, fewer than 100 or fewer than 50. The indicator appears at a predetermined location on the screen for a predetermined period of time such as 10 seconds or less.

The indicator therefore displays certain fields of data to the viewer, being fields containing data extracted from one or more packets being accessed by the monitored user device. These fields may include the website name from which the data packets are being accessed, or one or more words found within the metadata or filename of a file being accessed or downloaded by the user device. The words displayed in the indicator may be determined from a pre-stored/predetermined list of watchwords that when detected in incoming content cause the indicator to be displayed on the screen.

Rather than alerting the user watching the display coupled to the STB every time a website or file type is accessed or downloaded, the data or data packets can be compared against predetermined criteria. In the event that the data matches, or in some embodiments does not match, the predetermined criteria an indicator is displayed on the display. For example, the STB may include, in memory 310 or any other connected memory, a list or database of website addressed to which access is undesired. By performing a comparison of websites being visited by devices attached to the router circuitry 205 against the list of stored websites it can be identified each time an undesired website is accessed, and an appropriate indicator can be presented on the screen/display 202.

As described above, communication networks such as the internet transmit information between a source and a destination using streams of data packets. A packet generally comprises a header, the payload and a trailer. The header contains instructions or labels about the data carried by the packet, which may include the length of the packet, synchronization information, packet number, protocol (e.g. email, web page, video/audio, etc), destination address and source address. The packet header will also contain the source address (the IP address of the originating device), the source port (the TCP or UDP port number assigned by the originating computer to the packet) the destination address (the IP address of the receiving device) and the destination port. The payload contains the data being delivered by the packet to the destination. The trailer or footer indicates the end of the packet and may be used for error checking.

Deep packet inspection (DPI) is a form of packet examination that inspects the data/payload portion of a packet or series of packets as well as, optionally, the header portion. Deep packet inspection can be contrasted with shallow or stateful packet inspection performed by most home network firewalls which typically inspect only the header portion of packets. Referring to the OSI (Open Systems Interconnection) model stateful packet inspection works within the packet header layers 2-4, whereas DPI also works in the payload/application layers 5-7. DPI is performed by monitoring data packets passing through an inspection point and compares data within the packets with predefined criteria to identify undesired content.

A typical DPI filter may be used to identify viruses for example. The DPI filter may assemble a number of related, fragmented packets into a complete data packet using a packet normalizer. The normalized data packet can then be analysed, typically by inspecting the packets for patterns corresponding to known malicious code. The technique of scanning normalised data packets allows DPI to be used to inspect the overall data content being downloaded or streamed to a user device. The inspection of normalized packets may also be known as Deep Content Inspection (DCI), which may also be used in embodiments of the present invention. For the avoidance of doubt the DPI is, herein, used as a term that also includes DCI.

DPI can be used to detect properties of content being accessed. DPI can determine the protocol under which a packet is being sent such as HTTP, POP, SMPTE, IMAP, FTP and other standard protocols by analysing packet properties. DPI can therefore determine whether a packet or group of packets relate to an internet web page, an email or other type of content such as video or audio. DPI can further determine whether a packet or group of packets relate to a specific type of file format such as MP3, MPEG2, MPEG4, JPEG and so forth. DPI can also ignore protocols and perform raw string matching for text data contained within packets.

Using DPI it is possible to scan incoming packets for particular web addresses by searching packets text strings such as the "http", or "www" string and comparing the web address text data, or at least a portion of it, to a list of known web addresses within a database. It is also possible to scan incoming packets for known file types and to compare file types against a list of predetermined file types within a database or table. For example, it is possible to identify when packets relate to MP3, MP4, JPEG or any other type of media content file types by searching within packets for the file extension such as ".JPG" or ".MP3". Furthermore, if a text string is found indicating a particular file type such as "JPG", "MP3" or "MP4", being examples of image, audio and video files, then DPI can be used to identify the preceding file name and compare it with a prestored list of undesirable words in a database. When an undesired website, undesired file type, or undesired file type also containing undesired content is discovered, an indicator is presented on the display coupled to the STB containing populated data fields such as the website name, the file type, the file title and/or keyword that triggered detection of the file or website.

The database containing data indicative of undesired content may be editable or updatable by a user or a third party. In particular, the STB can receive updates via the internet connection, or via broadcast, containing lists of undesired content, such as undesirable websites, so that identification of these websites or other content can be performed. An interface, such as a webpage interface or computer application, may be provided for a user to input data indicative of websites or content that they consider undesirable. The user inputted data can then be transferred to the database within the STB via the local network if the computer or access terminal used to input the data is connected to the local network. Alternatively the data can be provided to the STB via another connection such as over the internet.

Figure 5:
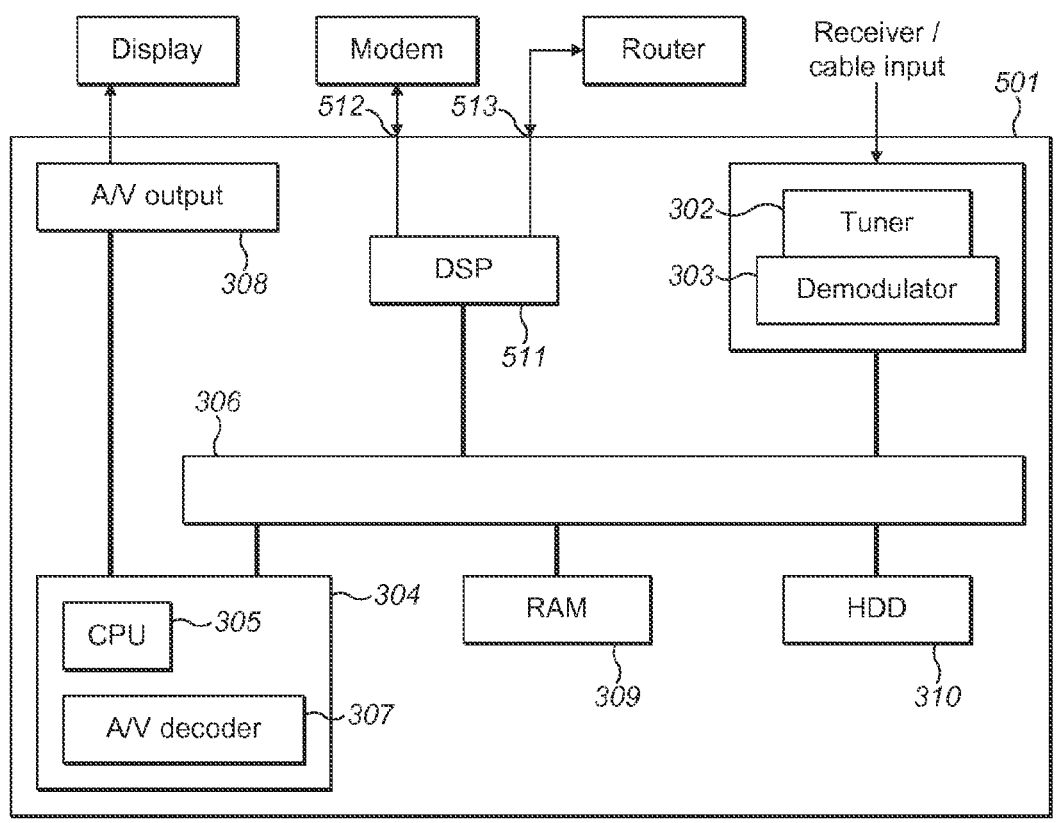
FIG. 5: shows a STB in accordance with an embodiment of the invention.

Now will be described the internal working of a STB according to an embodiment of the invention. FIG. 5 shows a STB 501 containing the same components described in relation to FIG. 3, with like reference numerals being used for like components. As with the arrangement described in FIG. 3, a basic functionality of the STB is to receive, decode and output broadcast media content to a display for viewing by a user.

In addition, a digital signal processor (DSP) 511 is provided within the STB 501. A connection 512 sends and receives content to and from a modem. A second connection 513 sends and receives content to and from a router. The DSP is placed at a monitoring point along the data path between the modem and the router such that all traffic to and from the local/home network passes through the monitor point. The DSP is configured to perform monitoring of the incoming and outgoing data packets, and preferably is configured to perform DPI. As undesired content is identified a user is notified by outputting an indicator to a screen as described above. This alerts the user when undesired content is being accessed over the local network.

The main processor, or a sub-component thereof, could be configured to perform the monitoring of traffic by providing connections 512 and 513 thereto and providing appropriate software to implement the necessary comparisons. However, it is preferred to use a separate processor such as a DSP because the monitoring function, and particularly DPI, typically requires a large amount of processing power. STBs may be provided with DSPs for imparting particular additional functionality such as placeshifting media content, which involves reformatting media content for transmission to, and playback on, other remote display devices over a local network or over the internet. The DSP can, according to embodiments of the invention, be configured for a different functionality, such as DPI, by providing appropriate software.

Figure 6:
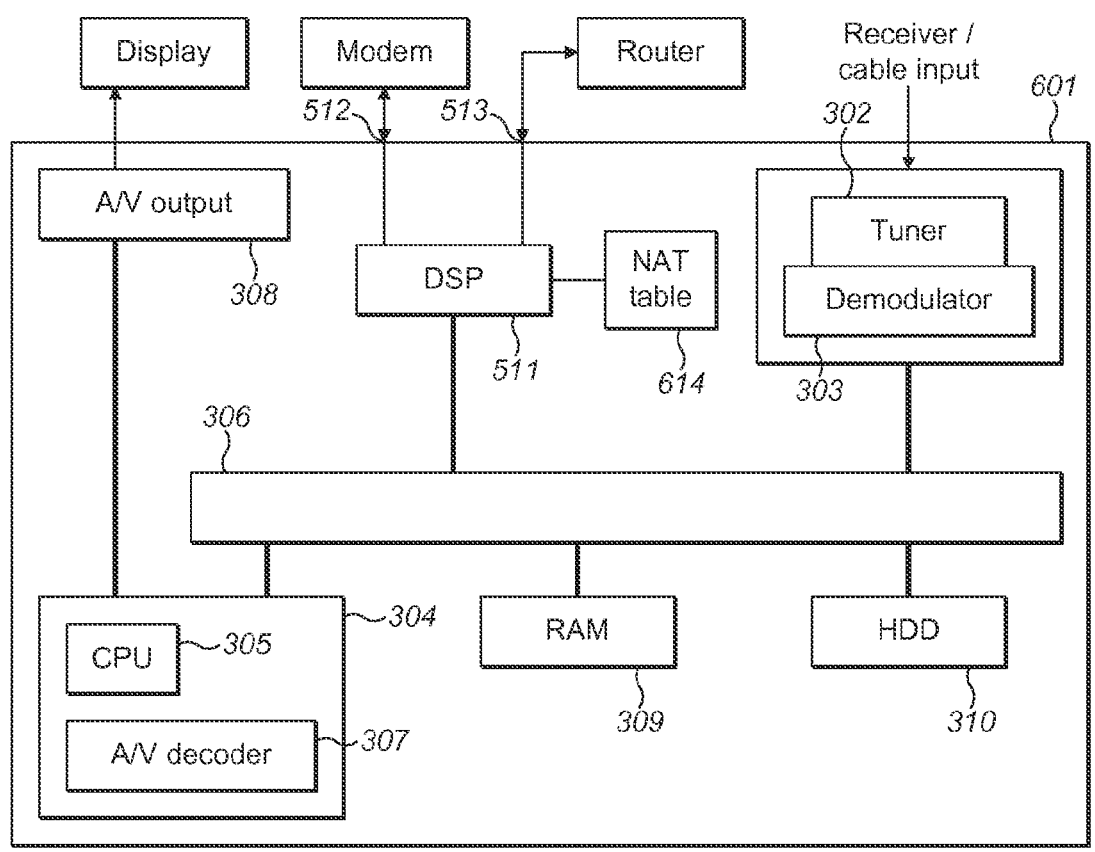
FIG. 6: shows a STB in accordance with a further embodiment of the invention.

The embodiment described in relation to FIG. 5 allows all network traffic to be monitored, regardless of the end user device to which it is intended. A further embodiment, shown in FIG. 6, allows the STB to take into account the intended recipient device.

FIG. 6 again shows a STB 601 with broadly similar functionality to the STB described in relation to FIG. 3 and FIG. 5. Again, like components share the same reference values. In addition, the STB of FIG. 6 includes a NAT table 614. As described above, the NAT table stores the routing details for data packets being handled by the router. The NAT table is used to track data packets and re-label data packet headers so that multiple devices can share a single internet connection with a single IP address. The NAT table may be provided in a number of ways. It may be stored on a dedicated memory, such as a dedicated RAM, or other type of memory or store, coupled to DSP 511. The NAT table may alternatively be stored in system RAM 309 or conceivably optional hard disk 310. Alternatively the DSP may be coupled to the NAT table in the router itself. In any case, coupled to the DSP is a NAT table, or a table that identifies a data packet's source and destination.

The NAT table is populated using the router based NAT table. This can be achieved by providing data from the router NAT table via connection 513. Based on data contained in the NAT table, the DSP can determine the intended destination of data packets. This can be used to select which connected user device's traffic is monitored. For example the DSP may be programmed to monitor traffic to/from a first user device such as a child's laptop, but not to monitor traffic to/from a second user device such as an adult's laptop or desktop. This prevents the user, watching the display coupled to the STB, from receiving unnecessary indicators when watching content via the STB. It also provides a way of limiting the amount of data that needs to be processed.

In order to enforce monitoring of traffic to certain user devices and to ignore traffic to other user devices a table can be provided listing those devices that do, or do not, need to be monitored. If a device, preferably identified by its local IP address, appears on the list then the STB will monitor traffic to/from the device. Of course the alternative arrangement could be used such that devices appearing on the list are those that are not monitored. The table or list of devices may be stored in a memory or store on the STB. Preferably this is a memory or store coupled directly to the DSP, but it may be any other memory coupled to the DSP. Preferably the memory used to store the list or table is a secure memory having password protection or other security to prevent unauthorised modification. The list or table may be user editable, using an input device to the STB to select which user devices are monitored, in which case the responsible user or authority can set a password to prevent unauthorised tampering with the list of monitored (or unmonitored) devices.

Figure 7:
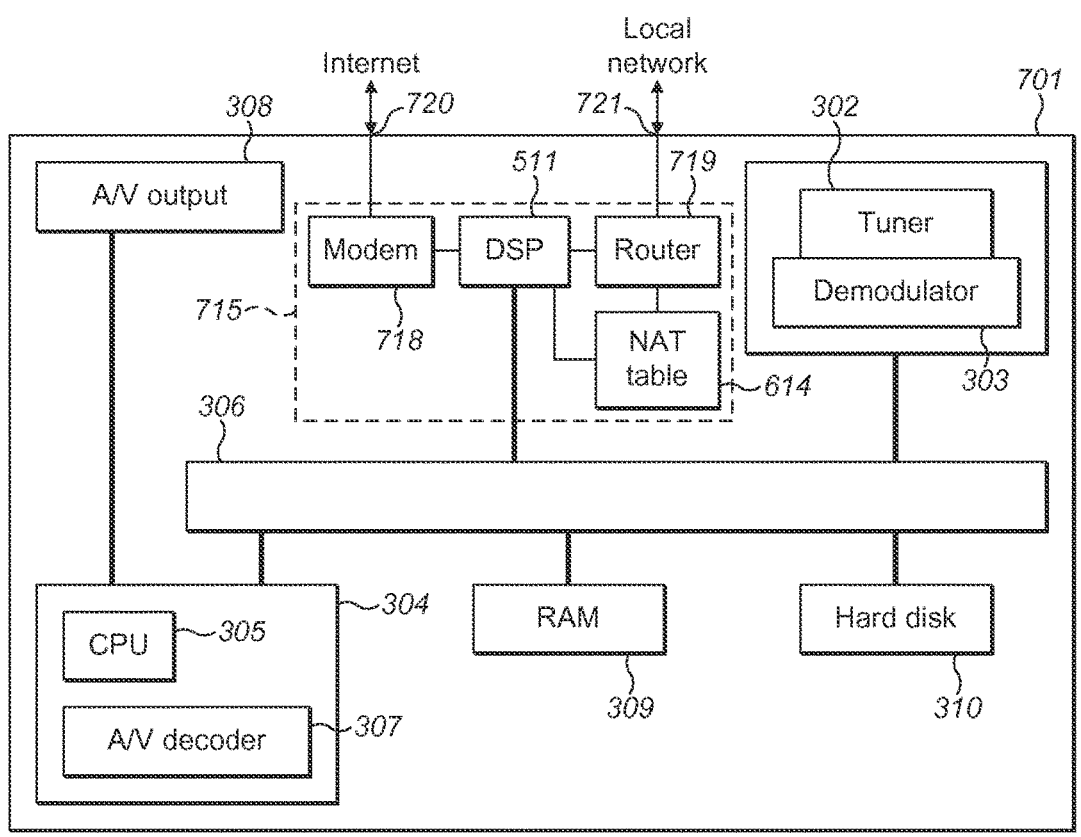
FIG. 7: shows a STB in accordance with a further embodiment of the invention.

One or more of the modem circuitry and the router circuitry may be provided within the STB. FIG. 7 shows such an example. Again, like reference numerals indicate like components. The STB 701 of FIG. 7 includes an integrated home gateway 715, meaning that the STB itself can function as a home gateway. The internal home gateway 715 comprises a modem circuit 718 for providing modem functionality, a router circuit 719 for providing router functionality, and a DSP 511 located between the router and modem circuits arranged to intercept data packets passing between them. The home gateway may be provided as separate components within the STB or as a collection of components on an integrated circuit. Also provided is NAT table 614, which may be coupled to both router circuit 719, which populates and maintains the table, and DSP 511 which utilises the NAT data to determine where data packets are destined or being received from.

A connection or port 720 is provided to the wall socket or whatever physical socket is provided for internet access. This may be a cable socket, in which case the modem circuitry would be a cable modem and the port 720 may be the same port used to provide media content data (i.e. a single cable input is used and demultiplexed/demodulated to separate each broadcast program channel and the internet connection). Alternatively, the internet connection socket may be a phone line, with the modem circuitry being ADSL circuitry for example.

In any embodiments described herein the STB has a component located between, or configured to intercept data passing between, the modem and the router. Additional functionality can be applied by configuring the STB to process the data beyond monitoring or inspecting for undesired content. For example, the STB or DSP may be configured to discard packets destined for a particular device for predetermined time periods or at predetermined times of day. Since the DSP has access to the NAT table it can determine what packets are destined for what devices and can extract these packets so they do not reach the router. Such action could be used only during predetermined times of day such that particular user devices are not permitted to access the internet at certain times. This could be achieved by only activating the monitoring functionality between certain predetermined periods as defined by the internal STB clock or an external clock source such as one provided via broadcast.

Embodiments have been described that provide a monitoring party or authority, such as a parent, with a means of monitoring, in real time, the web activities of users accessing the internet using a device connected to a local or home network whilst simultaneously viewing content on a display directly coupled to a STB. Such embodiments may assume that the display coupled to the STB is constantly on, such that the STB is constantly sending/outputting alerts or indicators whether the display is on or off. In addition, or instead, the STB may be configured to store data relating to any instances in which a user accesses undesired content and to display this when the STB is next used to view content. For example, the screen may not be in constant use, in which case the responsible party would not be aware of what is being accessed by a device connected to the home network. By storing internet access data, or more specifically by storing the indicators/warnings described above, when the STB is not being used to access or view broadcast content or other content such as on demand content, it is still possible to track what has been accessed by presenting the warnings or indicators the next time the STB is used to display content on the display.

To support such embodiments the STB may be configured to detect when the display to which it is coupled is on or off. If undesirable content is accessed when the display is not active the STB may be configured to store the indicator/warning for later display the next time the STB is determined to be switched on, or alternatively or in addition, to send the indicator/warning message by another route, e.g. via the internet connection, such as a Multimedia Messaging Service (MMS) message to a prescribed user's phone or an email to a prescribed user's email account. A memory may be provided for storing the email address, phone number or other contact details of the prescribed user or a user device associated with the prescribed user.

The STB connection to the display may be configured to exchange data, allowing information from the display to be received by the STB. This can include data generated by the display or television to which the STB is coupled, the data being indicative of whether the display is in a standby state or not. For example, where a connection such as HDMI (High-Definition Multimedia Interface) is used between the STB and the display the consumer electronics control (CEC) connection can be used in accordance with the HDMI standard. The CEC connection is designed to allow CEC enabled devices to communicate with one another, enabling functionality such as allowing the command and control of two or more connected CEC enabled devices using a single remote control. CEC also allows for individual CEC enabled devices to command and control each other. Using HDMI-CEC, the user may, for example, use one remote control to turn on the TV, DVD, and STB at the same time, and to adjust the system volume using one button. The CEC connection is provided as a single wire bus system, using pin 13 of the HDMI connector and sharing a common ground using pin 17.

The CEC communication system allows the transmission of informative or status type messages and request type messages from one device to another. An informative type message provides recipient devices with data such as standby or power status of the sending device. A request type message is a request from the sending device for information from, or that an action be taken by, the recipient device. A request type message may include a request for standby or power status.

The header block of a CEC message may contain the source logical address field, the destination logical address field, the end of message bit (EOM) and the acknowledge bit (ACK). The initiator logical address field is used to identify the initiator of the current frame. The logical address of the initiator is written in this field, which consists of bits one to four of the header block. The destination logical address field is used to identify the destination of the current frame. The logical address of the destination is written in this field which consists of bits five to eight of the header block. A message with the EOM bit set in the header block can be used to 'ping' other devices, to ascertain if they are powered on based on an acknowledgement of the message. Such a message is known as a <Polling Message>. In addition, or instead, the <Give Device Power Status> message can be used to determine the current power status of a target device. The target device responds with a <Report Power Status> message containing the power status operand giving standby data to the requesting device. The STB can therefore send the <Give Device Power Status> to the display or television which responds with the <Report Power Status> message. As a result, the STB can determine whether the coupled display is in operation or in standby mode. STBs according to the invention may be configured to only send indicators to the main, or directly coupled, display when the display is determined as being on. When the display is in standby mode, or completely off, the STB may be configured to use alternate means of sending indicators or warning messages as described above.

The STB may be configured to send a <Give Device Power Status> message at regular or periodic intervals so that the STB continually or periodically monitors the power status of the attached display device. Alternatively, the STB may be configured to send a <Give Device Power Status> message only after the occurrence of an event, such as the determination that an indicator should be sent. In other words, when the STB determines, in the manner described above, that undesired content is being accessed by a user device a <Give Device Power Status> message, or <Polling Message>, or any other type of message used to reveal the power status of the attached display, is sent to the display to determine its operational power status. Based on the received operational status data the STB is configured to determine whether an indicator is to be sent to the display, or whether alternative means for sending the indicator, such as an MMS or email via a network connection, should be used. If the received power status data indicates that the display is operational then the indicator is sent as usual. If the received power status data indicates that the display is not operational, being in standby mode for example, then the indicator is sent by other means as described above.

Arrangements other than HDMI-CEC can be used, provided the STB and display can exchange status information and in particular provided the display can send standby/power status data to the STB. Other connection such as SCART, which also provides a one wire bus for communication of status data, could also be used.

Since, in some embodiments, it is possible to identify which device is sending/receiving which data packets the indicators or warnings may present the user device's local IP number or any corresponding label identifying the device such as a device name, such that when multiple devices are being monitored, the responsible party is aware which device is accessing what content.

Figure 8:
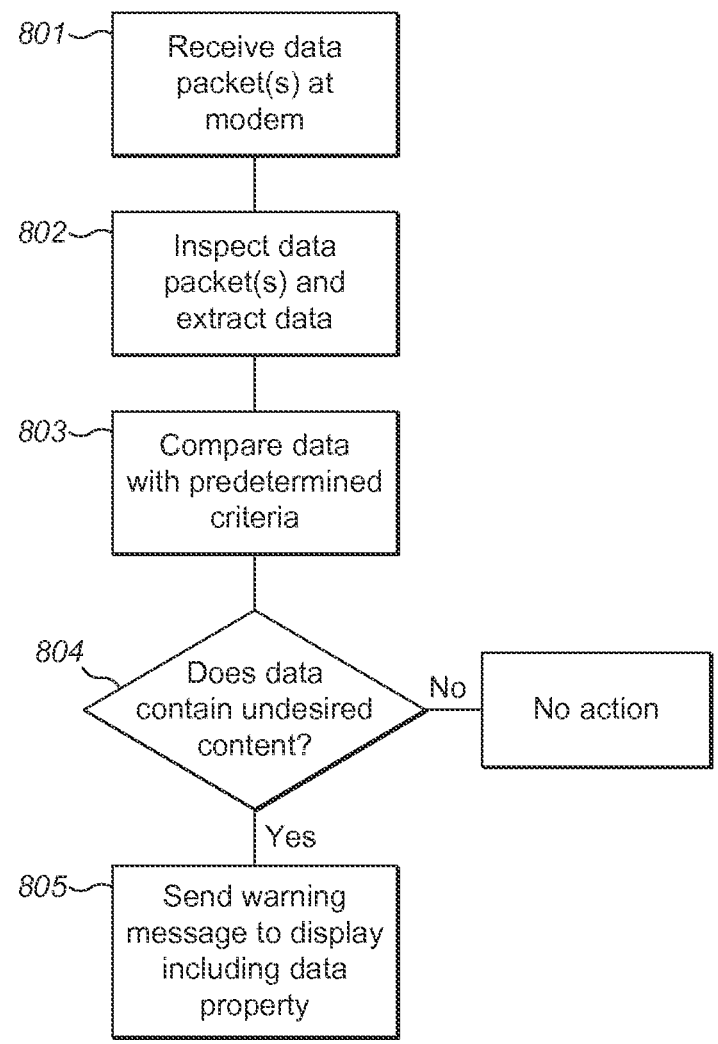
FIG. 8: outlines a method of indicating, using a STB, when a user device on a local network is accessing undesired content.

An outline of the monitoring process undertaken by the DSP of a STB according to embodiments of the invention is provided in FIG. 8. At step 801 data packets are received by the modem and demodulated in the usual way. The demodulated data packets are then inspected, in any of the manners described herein, at step 802 with data from one or more data fields within the data packet header or within the payload being extracted and compared, at step 803, with one or more predetermined criteria. Based on the comparison a decision is taken at step 804 as to whether undesired content has been detected, if, for example a website address matching a stored website address is identified. If no undesired content is detected then no further action is taken. If undesired content is detected then a warning message or indicator is sent to the display coupled to the STB including at least one data property such as the website address being accessed, a file type being downloaded/streamed or the name of a file being streamed/downloaded.

Figure 9:
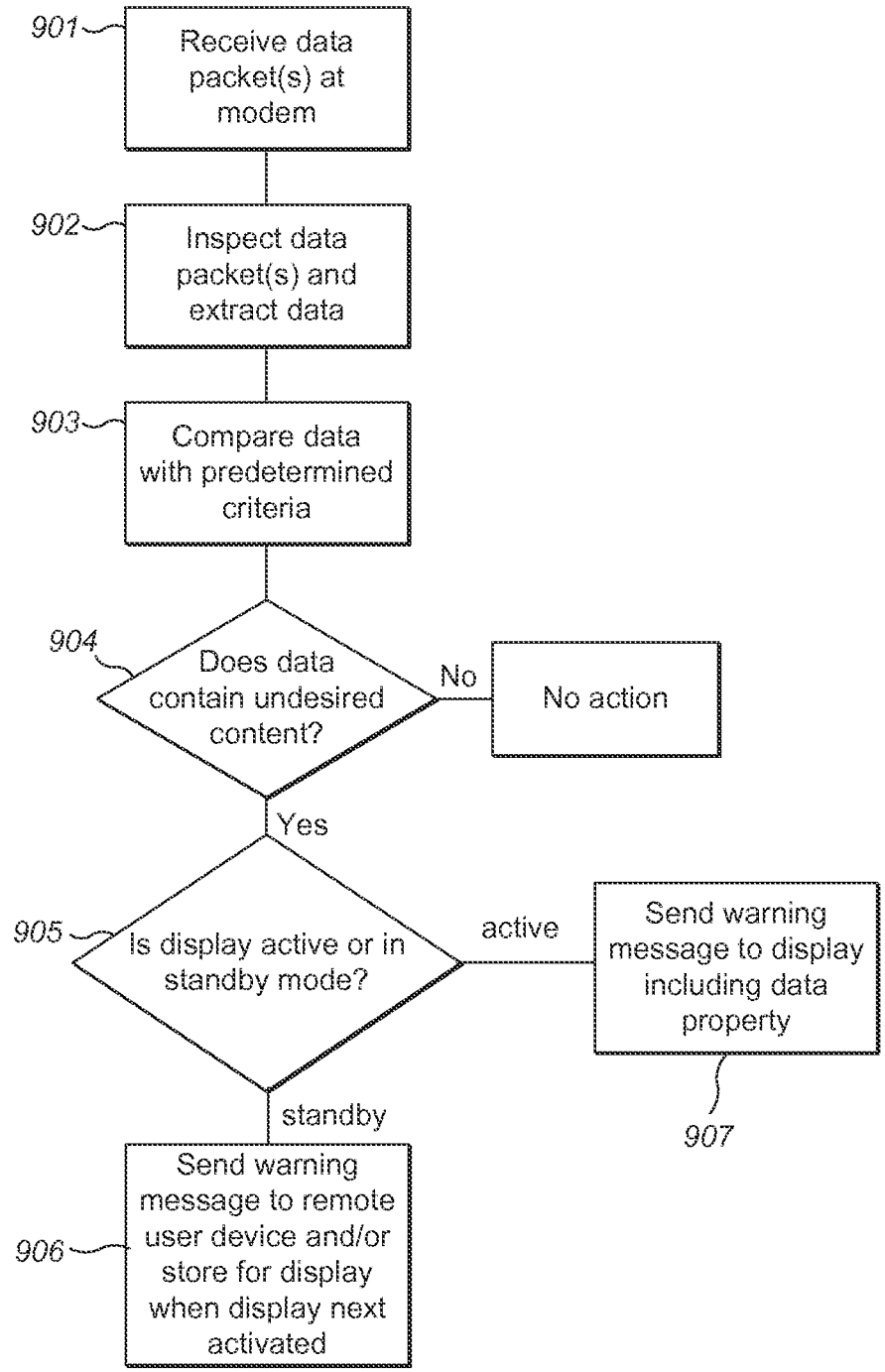
FIG. 9: outlines a method expanding on the method of FIG. 8.

FIG. 9 expands on the method described in relation to FIG. 8, including the same steps but also including the steps involved in determining whether the display to which the STB is coupled is active or in standby mode. As described above, a determination is made at step 905 as to whether the display is active or in standby mode. If the display is determined to be active then the method can continue as usual to step 907 where an indicator is output to the display. If the display is determined to be in standby mode then the method may proceed to step 906 wherein the indicator or warning is sent to another user device and/or stored for presentation the next time the display is activated.

The embodiments described above have involved sending a message or indicator to a display coupled to the STB to warn a viewer when content is accessed over a local network by an attached user device. The display is preferably the main display used by the STB to output content, being directly coupled to the STB by a cable or any other suitable interface means. However, the display may also, or instead, be any display coupled to the STB, including other displays used to display content from the STB it often being the case that a STB will be arranged to output content to more than one display within a house or residence.

Embodiments of the invention have been described in relation to modems or modem circuits such as DSL, ADSL or cable modems. Whilst modems such as ADSL are most common, using telephone lines to transmit broadband internet signals, it will be appreciated that any type of internet connection mechanism can be used, allowing any type of corresponding modem to be used. This may include internet connections via satellite, which can use satellite broadband modems, and power line based internet connections over power lines, which can use power line broadband modems.

The invention claimed is:

1. A set-top box for receiving broadcast media content and processing the broadcast media content for presentation on a display, the set-top box comprising:
   a receiver circuit for receiving the broadcast media content;
   an audio/video output connection for connecting to the display;
   a processor configured to:
      receive, from between a network router circuit and a wide area network modem circuit, internet network data packets comprising header data and payload data, sent over a local network, to or from a plurality of local user devices via the network router circuit, wherein the set-top box is coupled in series between the network router circuit and the wide area network modem circuit to receive all internet data packets sent from a wide area network to the local network;

access a network address translation table to determine from the plurality of local user devices a respective identity for each local user device associated with each internet network data packet received from the wide area network;

compare the respective identity of each local user device associated with each internet network data packet received from the wide area network to a protected table listing individual local user devices for which the internet network data packets are to be analyzed;

analyze the internet network data packets associated with an individual local user device listed in the protected table to determine whether they contain undesired content, the analyzing comprising inspecting the internet network data packets to identify at least one of a website name or a uniform resource locator of a site from which the internet network data packets are accessed; and when the undesired content is found, receive power status information from the display indicative of whether the display is activated or in standby mode, and determine, based on the received power status information from the display, whether the display is activated or in standby mode;

wherein:
when the display is determined to be activated, the processor is configured to send an indicator of the undesired content to the display for presentation; and when the display is determined to be in the standby mode, the processor is configured to transmit a notification of the undesired content via a network connection;

a first connection for connecting to the network router circuit; and a second connection for connecting to the wide area network modem circuit.

2. The set-top box according to claim 1, wherein the processor is configured to analyze the internet network data packets by performing deep packet inspection.

3. The set-top box according to claim 2, wherein:
the undesired content corresponds to a predetermined word or set of words, or a file type; and
the set-top box further comprises a memory for storing data indicative of the predetermined word or set of words, or the file type;
the processor being further configured to:
compare data contained within the internet network data packets, extracted by performing deep packet inspection, with the data indicative of the predetermined word or set of words, or the file type stored in the memory to determine whether the internet network data packets contain the undesired content; and
wherein the data contained within the internet network data packets includes one or more of the website name or uniform resource locator, a word or set of words contained in a website, a file name extension, and/or a file name.

4. The set-top box according to claim 1, wherein the network address translation table contains a destination and a source of the internet network data packets, the processor being further configured to determine a destination user device to/from which each internet network data packet is destined and to present, in the indicator, data indicative of the destination user device.

5. The set-top box according to claim 4, wherein the processor is further configured to:
receive input from a user identifying one or more user devices to be monitored;
store data in a memory indicative of the one or more identified user devices; and
control the display to present the indicator containing at least one property of the header data only when the data stored in memory identifies the destination user device as one of the user devices to be monitored.

6. The set-top box according to claim 1, wherein the network router circuit is integral to the set-top box and the wide area network modem circuit is also integral to the set-top box, the set-top box acting as a residential gateway, and wherein the set-top box further comprises a connection between the network address translation table and the processor.

7. The set-top box according to claim 1, wherein, when the display is determined to be activated, the indicator sent to the display contains at least one property of the header data for presentation to a user.

8. The set-top box according to claim 1, wherein, when the display is determined to be in the standby mode, the processor is configured for sending the indicator to a further user device via a network connection in a form of a multimedia messaging service message or an email.

9. The set-top box according to claim 1, wherein, the display is determined to be in the standby mode, storing in a memory data representing at least one property of the header data and controlling the display to present the indicator when the display is next determined to be activated.

10. The set-top box according to claim 7, wherein the set-top box is configured to send a request message to the display requesting power status information when undesired content is found or when the indicator is to be displayed.

11. The set-top box according to claim 10, wherein the audio/video output connection is coupled to the display by a high-definition multimedia interface connection and the request message is sent by a consumer electronics control connection.

12. The set-top box according to claim 1, wherein:
the processor is further configured to filter internet network data packets containing undesired content such that filtered internet network data packets do not reach a destination local user device; and
the processor is a digital signal processor that is different from a separate processor configured to process the broadcast media content.

13. The set-top box according to claim 1, wherein the display is directly coupled to the audio/video output connection by a high-definition multimedia interface cable.

14. The set-top box of claim 1, wherein the indicator presented comprises an overlay including a file type being streamed or downloaded.

15. The set-top box of claim 1, wherein the indicator presented comprises an overlay including a website address being accessed.

16. The set-top box of claim 1, wherein the indicator is presented on the display for a predetermined period of time or 10 seconds or less.

17. The set-top box of claim 1, wherein the indicator presented comprises an overlay occupying 10% or less of a screen size.

18. The set-top box of claim 1, wherein the protected table includes a predetermined daily portion of time during which the internet network data packets for at least one individual local user device are to be analyzed.

19. The set-top box of claim 1, wherein the protected table comprises a password-protected table.

20. A method of indicating when a user device on a local network is accessing undesired content, the method comprising:

provjding a set-top box for receiving and processing broadcast media content for presentation on a display, wherein the set-top box comprises:
- a receiver circuit for receiving the broadcast media content;
- an audio/video output connection for connecting to the display;
- a processor;
- a first connection for connecting to a network router circuit; and
- a second connection for connecting to a wide area network modem circuit;

receiving, at the processor of the set-top box, internet network data packets comprising header and payload data, from between the network router circuit and the wide area network modem circuit, sent over the local network to or from a plurality of local user devices via the network router circuit, wherein the processor is coupled in series between the network router circuit and the wide area network modem circuit to receive all internet data packets sent from a wide area network to the local network;

accessing a network address translation table to determine from the plurality of local user devices an identity for each local user device associated with each internet network data packet received from the wide area network;

comparing the respective identity of each local user device associated with each internet network data packet received from the wide area network with a protected table listing individual local user devices for which the internet network data packets are to be analyzed;

analyzing the internet network data packets associated with an individual local user device included in the protected table using the processor to determine whether they contain undesired content, the analyzing comprising inspecting the internet network data packets to identify at least one of a website name or a uniform resource locator of a site from which the internet network data packets are accessed; and when undesired content is found, receiving power status information from the display indicative of whether the display is activated or in standby mode, and determine, based on the received power status information from the display, whether the display is activated or in standby mode;

wherein:
- when the display is determined to be activated, an indicator of the undesired content is sent to the display for presentation; and
- when the display is determined to be in the standby mode, a notification of the undesired content is transmitted via a network connection.

\* \* \* \* \*